US011036446B2

(12) United States Patent
Tanaka et al.

(10) Patent No.: US 11,036,446 B2
(45) Date of Patent: Jun. 15, 2021

(54) PRINTING SYSTEM ESTIMATING AND DISPLAYING POWER CONSUMPTION CONSUMED BY PRINT PROCESSING IN IMAGE FORMING APPARATUS

(71) Applicant: KYOCERA Document Solutions Inc., Osaka (JP)

(72) Inventors: Koichi Tanaka, Osaka (JP); Tomoyuki Kitao, Osaka (JP); Masayuki Shigetomi, Osaka (JP); Tetsuo Tomimatsu, Osaka (JP); Hitoshi Matsumoto, Osaka (JP); Atsushi Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/932,257

(22) Filed: Jul. 17, 2020

(65) Prior Publication Data

US 2021/0026579 A1 Jan. 28, 2021

(30) Foreign Application Priority Data

Jul. 24, 2019 (JP) .............................. JP2019-136381

(51) Int. Cl.
*G06F 3/12* (2006.01)
(52) U.S. Cl.
CPC .......... *G06F 3/1226* (2013.01); *G06F 3/1204* (2013.01); *G06F 3/1221* (2013.01)
(58) Field of Classification Search
CPC ..... G06F 3/1226; G06F 3/1204; G06F 3/1221
USPC ....................................................... 358/1.15
See application file for complete search history.

(56) References Cited

U.S. PATENT DOCUMENTS

| | | | | |
|---|---|---|---|---|
| 2005/0012958 A1* | 1/2005 | Watanabe | .......... | H04N 1/00145 358/1.15 |
| 2009/0157375 A1* | 6/2009 | Yamamoto | ............ | G06F 30/367 703/14 |
| 2012/0060041 A1* | 3/2012 | Hashimoto | ........... | G06F 1/3209 713/310 |
| 2012/0159223 A1* | 6/2012 | Furubayashi | ......... | G06F 1/3215 713/323 |
| 2013/0031385 A1* | 1/2013 | Seto | ......................... | G06F 1/28 713/300 |

(Continued)

FOREIGN PATENT DOCUMENTS

JP 2013-186775 A 9/2013

*Primary Examiner* — Allen H Nguyen
(74) *Attorney, Agent, or Firm* — Studebaker & Brackett PC

(57) ABSTRACT

A printing system includes a user terminal and a plurality of image forming apparatuses. Each of the plurality of image forming apparatuses includes a status information transmitting part transmitting status information indicating a status of the image forming apparatus. The user terminal includes a power consumption estimating part and a display controlling part. The power consumption estimating part estimates power consumption consumed by print processing in the image forming apparatus on the basis of the state information received from the image forming apparatus with regard to the plurality of image forming apparatuses. The display controlling part controls to display the power consumption estimated by the power consumption estimating part in association with each of the plurality of image forming apparatuses on a displaying device.

9 Claims, 6 Drawing Sheets

(56) References Cited

U.S. PATENT DOCUMENTS

2014/0036306 A1\* 2/2014 Matsuda ............... G06F 3/1221
358/1.15

\* cited by examiner

US 11,036,446 B2

PRINTING SYSTEM ESTIMATING AND DISPLAYING POWER CONSUMPTION CONSUMED BY PRINT PROCESSING IN IMAGE FORMING APPARATUS

INCORPORATION BY REFERENCE

This application is based on and claims the benefit of priority from Japanese Patent application No. 2019-136381 filed on Jul. 24, 2019, the entire contents of which are incorporated herein by reference.

BACKGROUND

The present disclosure relates to a printing system capable of utilizing a plurality of image forming apparatuses.

Conventionally, in a printing system capable of utilizing a plurality of image forming apparatuses, a method of automatically selecting an image forming apparatus with the least power consumption when receiving a printing instruction from a user terminal and making this selected image forming apparatus perform printing is proposed. In accordance with such a conventional method, it is possible to reduce power consumption required for printing performing.

However, in the conventional method, the user cannot select the image forming apparatus for performing printing. Therefore, there is a possibility deteriorating convenience of the user. For example, if the image forming apparatus located separate from a seat of the user is selected, labor of the user going for a printed matter is increased.

SUMMARY

A printing system of the present disclosure includes a user terminal and a plurality of image forming apparatuses. Each of the plurality of image forming apparatuses includes a status information transmitting part transmitting status information indicating a status of the image forming apparatus. The user terminal includes a power consumption estimating part and a display controlling part. The power consumption estimating part estimates power consumption consumed by print processing in the image forming apparatus on the basis of the state information received from the image forming apparatus with regard to the plurality of image forming apparatuses. The display controlling part controls to display the power consumption estimated by the power consumption estimating part in association with each of the plurality of image forming apparatuses on a displaying device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION (Printing System)

Figure 1:
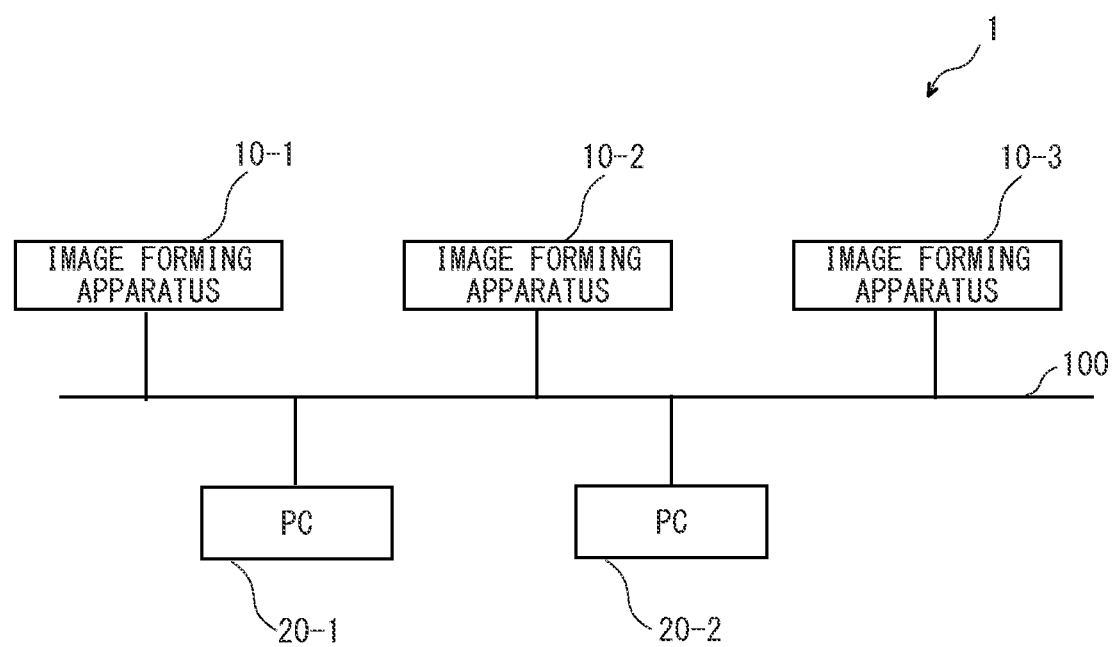
FIG. 1 is a block diagram showing a printing system according to an embodiment of the present disclosure.

FIG. 1 is a block diagram showing a configuration of a printing system 1 according to an embodiment of the present disclosure. As shown in FIG. 1, the printing system 1 includes image forming apparatuses 10 (10-1, 10-2, 10-3) and user terminals 20 (20-1, 20-2).

The image forming apparatus 10 is, for example, a multifunction peripheral (MFP) to have a copying function, a document reading function, a facsimile communicating function, a document data storing function and others. Incidentally, the image forming apparatus 10 of the embodiment is an image forming apparatus of an electrographic manner. The user terminal 20 (20-1, 20-2) is, for example, a personal computer (including a key board, a pointing device, a monitor device and other typical peripheral equipment of the personal computer). Hereinafter, the user terminal 20 is called as a PC 20. The image forming apparatus 10 and the PC 20 are communicably connected with each other via a network 100. The network 100 is a computer network, such as an internet or a local area network.

Incidentally, in FIG. 1, three image forming apparatuses 10-1, 10-2 and 10-3 and two user terminals 20-1 and 20-2 are illustrated, but any number of image forming apparatuses 10 and any number of user terminals 20 may be included in the printing system 1.

(Function of Image Forming Apparatus and User Terminal)

Figure 2:
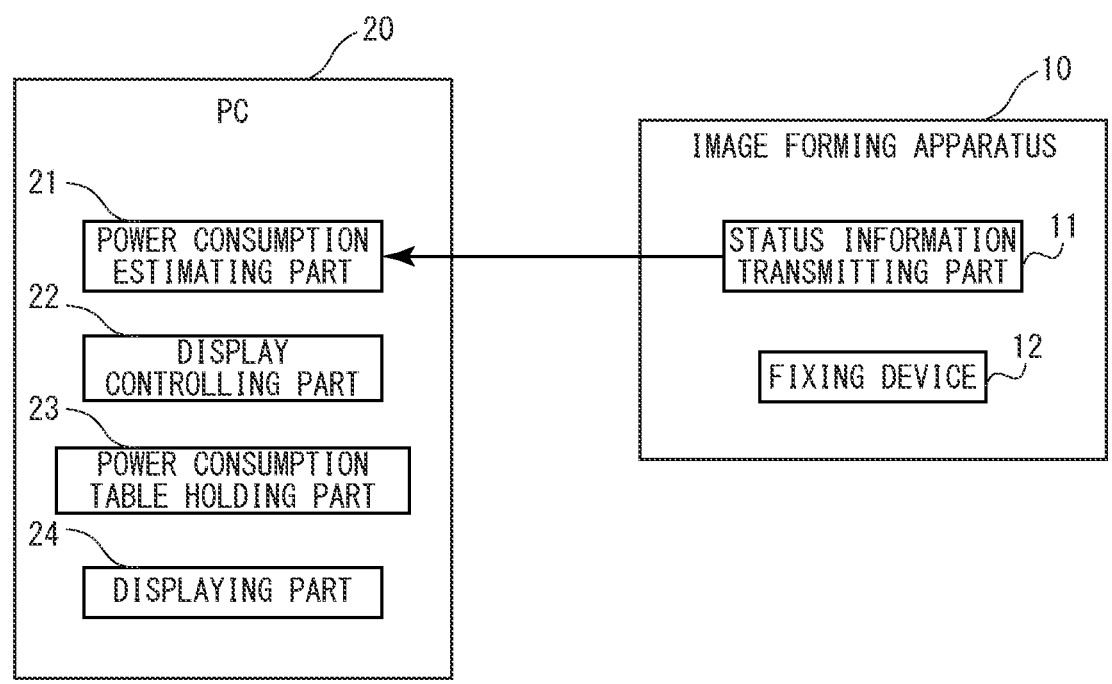
FIG. 2 is a block diagram showing an image forming apparatus and a personal computer in the printing system according to an embodiment of the present disclosure.

FIG. 2 is a block diagram showing an example of function blocks of the image forming apparatus 10 and the PC 20 in the printing system 1.

The image forming apparatus 10 includes, as shown in FIG. 2, a status information transmitting part 11. The image forming apparatus 10 has, for example, a CPU, a ROM, a RAM and others, and the CPU develops a program stored in the ROM into the RAM and executes the program to actualize functions of the status information transmitting part 11. The status information transmitting part 11 transmits status information indicating a status of the image forming apparatus 10 to the PC 20. The status information contains information required for estimation of an electric power amount consumed by print processing in the image forming apparatus 10.

In general, in an image forming apparatus of an electrographic manner, most of the electric power amount consumed by print processing is an electric power amount consumed by processing of raising temperature of a fixing device to temperature capable of printing (hereinafter, called as warm-up). Therefore, by knowing an electric power amount consumed by warm-up, it is possible to estimate the electric power amount consumed by print processing. Moreover, the electric power amount consumed by warm-up is determined according to the temperature of the fixing device at the start of warm-up. That is, by knowing the temperature of the fixing device at the start of warm-up, it is possible to estimate the electric power amount consumed by print processing. Thereupon, in the embodiment, the status information transmitted by the status information transmitting part 11 is created to contain present temperature of a fixing device 12 in order to make the PC 20 estimate the electric power amount consumed by print processing of the image forming apparatus 10.

The PC 20 includes, as shown in FIG. 2, a power consumption estimating part 21, a display controlling part 22, a power consumption table holding part 23 and a displaying part 24. The PC 20 has, for example, a CPU, an HDD (Hard Disk Drive) or an SSD (Solid State Drive), a RAM and others, and the CPU develops a program stored in the HDD or the SSD into the RAM and executes the program to actualize functions of the power consumption estimating part 21, the display controlling part 22 and the power consumption table holding part 23. The displaying part 24 is composed of a displaying device, such as a liquid crystal display. Incidentally, the displaying part 24 may be composed of a displaying device arranged outside the PC 20. Hereinafter, the displaying part 24 is often called as a displaying device.

The power consumption estimating part 21 estimates the electric power consumed by print processing of the image forming apparatus 10 on the basis of the state information received from the image forming apparatus 10. Hereinafter, the electric power consumed by print processing of the image forming apparatus 10 is often called as power consumption simply.

Incidentally, in the embodiment, the power consumption estimating part 21 receives (obtains) the state information from the image forming apparatuses 10 (10-1, 10-2, 10-3), respectively. Subsequently, the power consumption estimating part 21 estimates the power consumption for each of the image forming apparatuses 10 on the basis of the state information received from each image forming apparatus 10.

The display controlling part 22 displays the power consumption estimated by the power consumption estimating part 21 for each image forming apparatus 10 selectable as a print destination. Here, the image forming apparatus 10 selectable as a print destination is the image forming apparatus 10 in a state of being communicable from the PC 20 out of the image forming apparatuses 10 connected to the PC 20 via the network 100.

The power consumption table holding part 23 holds a power consumption table. The power consumption table is a table storing the electric power amount consumed by print processing of the image forming apparatus 10 in association with the temperature of the fixing device 12. The power consumption table holding part 23 holds power consumption tables respectively corresponding to the image forming apparatuses 10-1, 10-2, 10-3. Incidentally, the power consumption table holding part 23 may hold one power consumption table for each machine model of the image forming apparatus 10. In such a situation, since it is sufficient to hold one power consumption table for a plurality of image forming apparatuses 10 having the same machine model, it is possible to reduce a capacity of a storing area for holding the power consumption table.

(Temperature Characteristic of Fixing Device)

Figure 3:
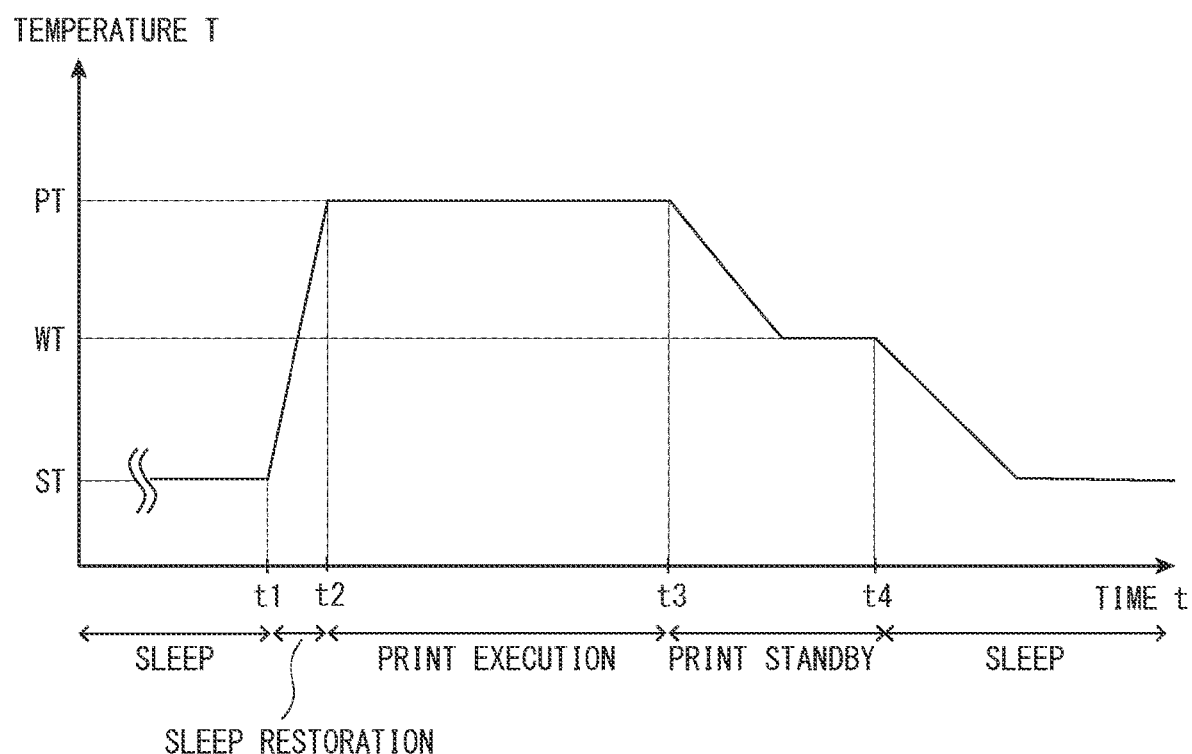
FIG. 3 is a graph plotting temperature characteristic of a fixing device.

Here, temperature characteristic of the fixing device 12 of the image forming apparatus 10 will be described. FIG. 3 is an example of a graph plotting temperature characteristic of the fixing device 12. In the figure, a vertical axis shows temperature T of the fixing device 12 and a horizontal axis shows time t. Incidentally, as an operation mode of the image forming apparatus 10 in the embodiment, there are a normal mode and a sleep mode having power consumption less than the normal mode. Incidentally, for simplifying description, another operation mode, such as a low power mode, is not considered. In the sleep mode, supplying of the electric power to the fixing device 12 is stopped for electric power saving. Temperature ST of the fixing device 12 at the sleep mode is the same level as temperature around image forming apparatus 10.

When receiving a print job at the sleep mode (time t1), the image forming apparatus 10 starts supplying of the electric power to the fixing device 12 to execute warm-up of the fixing device 12. Subsequently, when the temperature of the fixing device 12 is risen to temperature PT capable of printing (time t2), the image forming apparatus 10 starts printing. Hereinafter, a period from time t1 to time t2 is called as a warm-up period or a sleep restoration period.

When printing is finished, the image forming apparatus 10 adjusts a supply amount of the electric power to the fixing device 12 to lower the temperature of the fixing device 12 to standby temperature WT. Subsequently, until a predetermined time is elapsed from time t3, the image forming apparatus 10 maintains the temperature of the fixing device 12 to the standby temperature WT. This is carried out in order to prepare for a case where print jobs are continuously inputted from the PC 20. Therefore, the standby temperature WT is set higher than the temperature ST at the sleep mode when supplying of the electric power to the fixing device 12 is stopped. When the predetermined time is elapsed from time t3 (time t4), the image forming apparatus 10 stops supplying of the electric power to the fixing device 12 to shift the operation mode to the sleep mode. When a predetermined time is elapsed after shifting to the sleep mode, the temperature ST of the fixing device 12 is lowered to the same level as the temperature around image forming apparatus 10. Hereinafter, a period from time t3 to time t4 is called as a print standby period. Incidentally, the temperature PT capable of printing or the standby temperature WT may be varied according to the machine model of the image forming apparatus 10.

(Estimation of Power Consumption)

The power consumption (the electric power amount consumed by print processing of the image forming apparatus 10) is varied between a case receiving the print job at the normal mode and a case receiving the print job at the sleep mode.

The power consumption in the case receiving the print job at the normal mode is derived (estimated) by adding electric power amounts a1 and a2 as described later.

(a1) An electric power amount required for warm-up (a2) An electric power amount required for print of one sheet * the number of print sheets On the other hand, the power consumption in the case receiving the print job at the sleep mode is derived (estimated) by adding electric power amounts b1, b2 and b3 as described later.

Figure 4:
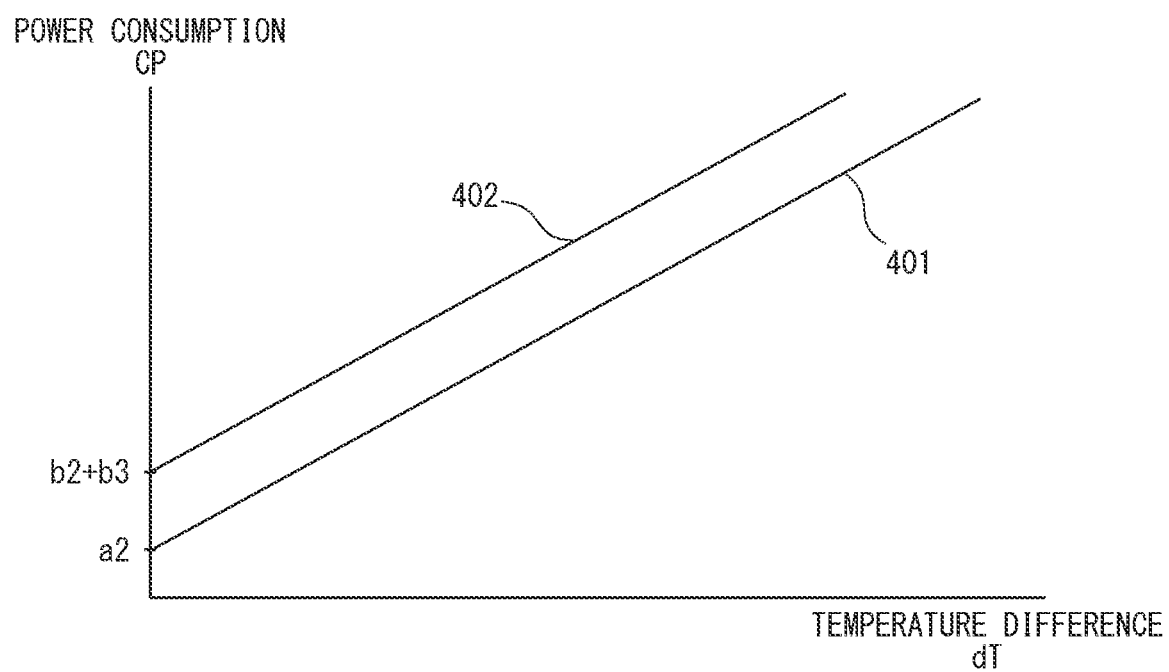
FIG. 4 is a graph plotting parameters of power consumption table held in a power consumption table holding part.

(b1) An electric power amount required for warm-up (b2) An electric power amount required for print of one sheet * the number of print sheets (b3) An electric power amount for maintaining the fixing device 12 to the standby temperature WT for the print standby period FIG. 4 is an example of a graph plotting parameters of the power consumption table held in the power consumption table holding part 23. In FIG. 4, a vertical axis shows the power consumption CP (the electric power amount consumed by print processing of the image forming apparatus 10) and a horizontal axis shows a temperature difference dT between the temperature of the fixing device 12 at the start of warm-up and the temperature PT capable of printing. The electric power amount a1 or b1 required for warm-up is increased more, as the temperature difference dT is larger. On the other hand, the electric power amounts a2, b2 and b3 are not affected by the temperature of the fixing device 12. Therefore, the power consumption table is determined by a table as illustrated in FIG. 4. Incidentally, the electric power amounts a1 and a2, and b1, b2 and b3 are previously derived on the basis of a designed value or an actual measured value in developing the image forming apparatus 10. Moreover, although FIG. 4 illustrates an example that the power consumption CP and the temperature difference dT are in linear relationship, the power consumption CP and the temperature difference dT may be other correlation. A table 401 is a power consumption table at the normal mode. A table 402 is a power consumption table at the sleep mode. Incidentally, since the electric power amount required for print of one sheet is not varied between the normal mode and the sleep mode, the electric power amount a2 and the electric power amount b2 are equal.

Figure 5A:
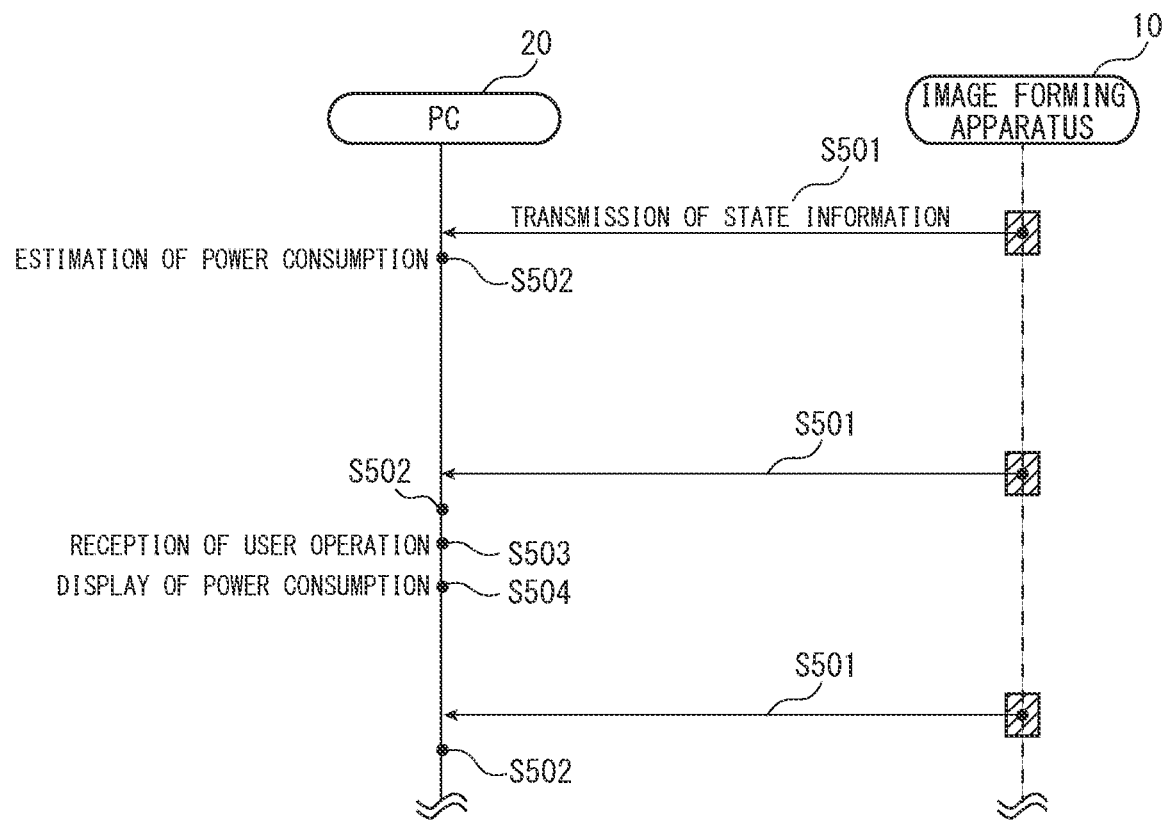
FIG. 5A is a sequence chart showing an example of a transmitting sequence for status information of the image forming apparatus in the printing system according to the embodiment of the present disclosure.
Figure 5B:
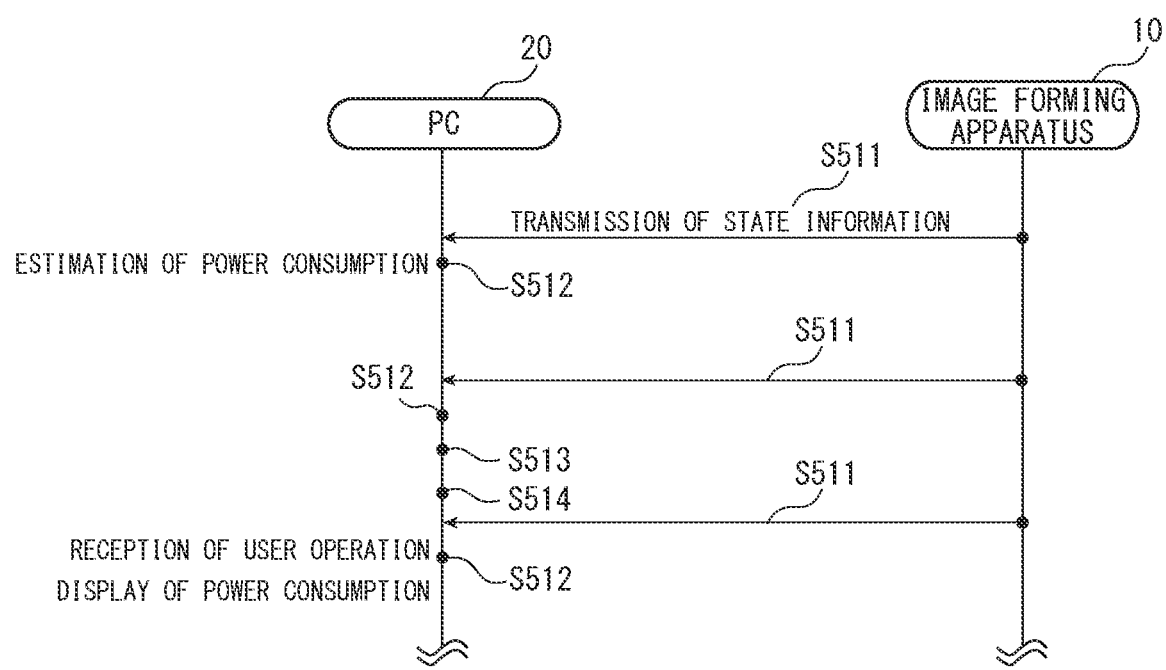
FIG. 5B is a sequence chart showing another example of a transmitting sequence for status information of the image forming apparatus in the printing system according to the embodiment of the present disclosure.

The power consumption estimating part 21 obtains present temperature of the fixing device 12 from the state information received from the state information transmitting part 11. Subsequently, the power consumption estimating part 21 refers to the power consumption table held by the power consumption table holding part 23 to obtain the power consumption CP corresponding to the difference dT between obtained temperature and the temperature PT capable of printing. At this time, the power consumption estimating part 21 refers any one of the table 401 and the table 402 shown in FIG. 4 in accordance with the operation mode of the image forming apparatus 10. Incidentally, the operation mode is obtained from the state information. That is, the state information contains information relating to the operation mode. Alternatively, as shown in FIG. 5A and FIG. 5B described later, a transmitting timing of the state information is varied between the sleep mode and the normal mode of the image forming apparatus 10. Therefore, the power consumption estimating part 21 may decide the operation mode of the image forming apparatus 10 in accordance with the transmitting timing of the state information.

(Transmission of Status Information)

FIG. 5A and FIG. 5B are sequence charts showing examples of a transmitting sequence for the status information of the image forming apparatus 10 in the printing system 1.

First, the transmitting sequence of the status information at the sleep mode will be described. FIG. 5A illustrates an example of the transmitting sequence for the status information at the sleep mode. The image forming apparatus 10 operates a communicating function in a power saving mode for power saving when shifting to the sleep mode. In order to make the PC 20 recognize the image forming apparatus 10 while operating the communicating function in the power saving mode, the image forming apparatus 10 restores the communicating function from the power saving mode at fixed intervals to execute information transmission for informing existence of the image forming apparatus 10 to the PC 20. When information transmission is finished, the image forming apparatus 10 operates the communicating function in the power saving mode again.

In the embodiment, at the sleep mode, transmission of the state information is executed by using a timing of executing the above-described information transmission. In such a method, since the communicating function is not restored from the power saving mode more than necessary, it is possible to restrain the power consumption of the image forming apparatus 10.

A section indicated by an inclined line in FIG. 5A shows a section where the communicating function is restored from the power saving mode for the above-described information transmission. As shown in FIG. 5A, the state information transmitting part 11 of the image forming apparatus 10 transmits the state information to the PC 20 at a timing of executing the above-described information transmission (step S501). Then, the power consumption estimating part 21 of the PC 20 estimates the power consumption (the electric power amount consumed by print processing of the image forming apparatus 10) on the basis of present temperature of the fixing device 12 obtained from the received state information (step S502). The power consumption is an electric power amount consumed from receiving of the print job in the image forming apparatus 10 to finishing of a series of processing for the print job, and is determined by an added value of the above-described electric power amounts b1, b2 and b3 as described above.

The display controlling part 22 of the PC 20 receives given user operation inputted via an inputting device (not shown), such as a key board (step S503). Then, the display controlling part 22 of the PC 20 displays the most recent power consumption estimated by the power consumption estimating part 21 (step S504).

Figure 6A:
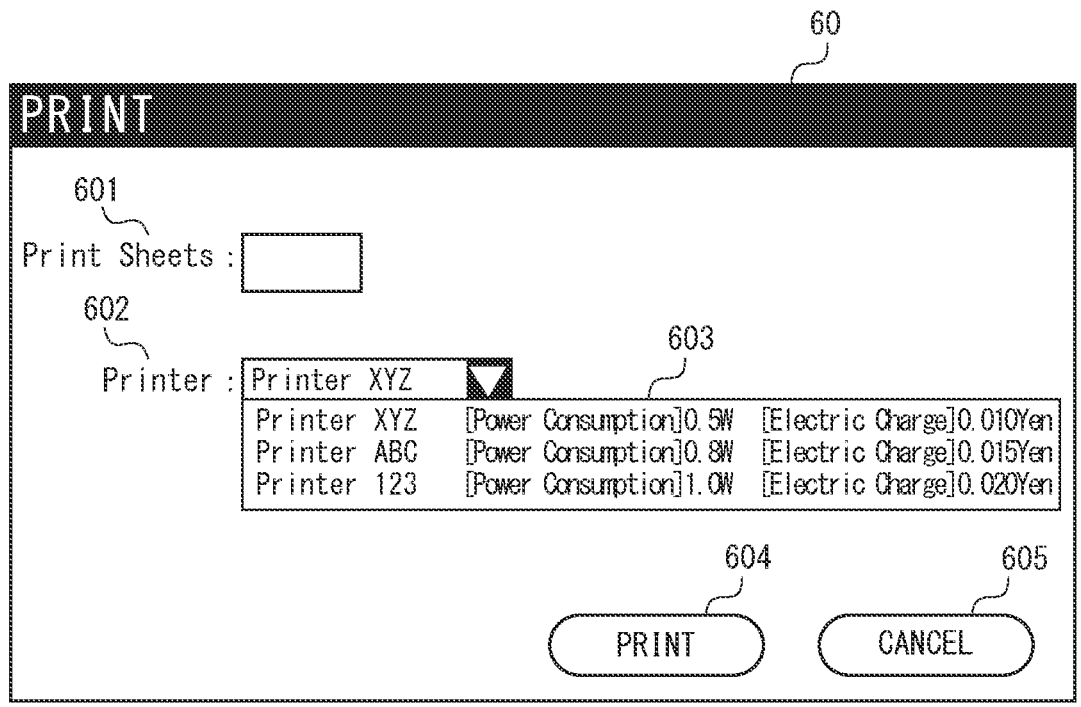
FIG. 6A is a plan view showing an example of a display screen of power consumption estimated by a power consumption estimating part.

FIG. 6A is a plan view showing an example of a display screen (a displaying method) of the power consumption estimated by the power consumption estimating part 21. The display controlling part 22 displays the power consumption estimated by the power consumption estimating part 21 on a print screen 60. The print screen 60 is a user interface screen for carrying out execution instruction of print, and includes a print number setting area 601, a printer selecting area 602, a print button 604 and a cancel button 605. Incidentally, the print screen 60 shown in FIG. 6A is an example, the print screen 60 may include another area or another button.

The print number setting area 601 is an area for setting the number of print sheets. The printer selecting area 602 is an area for selecting the image forming apparatus 10 for executing print. When an inverse triangular button of the printer selecting area 602 is pressed, the display controlling part 22 display a list 603 (a printer list) of the image forming apparatuses 10 selectable as the print destination. At that time, as shown in FIG. 6A, the display controlling part 22 displays a combination of the power consumption estimated by the power consumption estimating part 21 and an electric charge corresponding to the power consumption in association with identification information (wherein a machine name) of the image forming apparatus 10. The electric charge corresponding to the power consumption may be stored in the power consumption table in association with the power consumption or may be derived from the power consumption in accordance with a predetermined calculation formula by the power consumption estimating part 21. Moreover, when displaying the printer list 603, the display controlling part 22 displays the image forming apparatuses 10 in ascending order of the power consumption from the top of the printer list 603. At this time, the display controlling part 22 may display the image forming apparatuses 10 in ascending order of the electric charge from the top of the printer list 603.

Thus, by displaying the power consumption and the electric charge with the identification information of the image forming apparatus 10, it is possible to select the image forming apparatus 10 having less power consumption or the image forming apparatus 10 having lower electric charge as the print destination.

The user selects the image forming apparatus 10 for executing print from the displayed printer list 603. Then, on the printer selecting area 602, the identification information of the image forming apparatus 10 selected by the user is displayed. In an example shown in FIG. 6A, the image forming apparatus "Printer XYZ" is selected as the image forming apparatus 10 for executing print. Here, the image forming apparatus "Printer XYZ" corresponds to the image forming apparatus 10-1 shown in FIG. 1. Moreover, the image forming apparatus "Printer ABC" corresponds to the image forming apparatus 10-2 shown in FIG. 1. Further, the image forming apparatus "Printer 123" corresponds to the image forming apparatus 10-3 shown in FIG. 1. In such a situation, when the print button 604 is pressed, to the image forming apparatus "Printer XYZ", i.e. the image forming apparatus 10-1, the print job is transmitted. Subsequently, the display controlling part 22 closes the print screen 60. If the cancel button 605 is pressed, transmission of the print job is not carried out. Subsequently, the display controlling part 22 closes the print screen 60.

Incidentally, the identification information of the image forming apparatus 10 displayed on the printer list 603 may be information capable of specifying the image forming apparatus 10, but is not limited by the machine name. For example, the identification information may be a number (an identification number) capable of uniquely specifying the image forming apparatus 10. Moreover, although FIG. 6A illustrates an example of displaying both the power consumption and the electric charge on the printer list 603, any one of the power consumption and the electric charge may be displayed on the printer list 603.

Figure 6B:
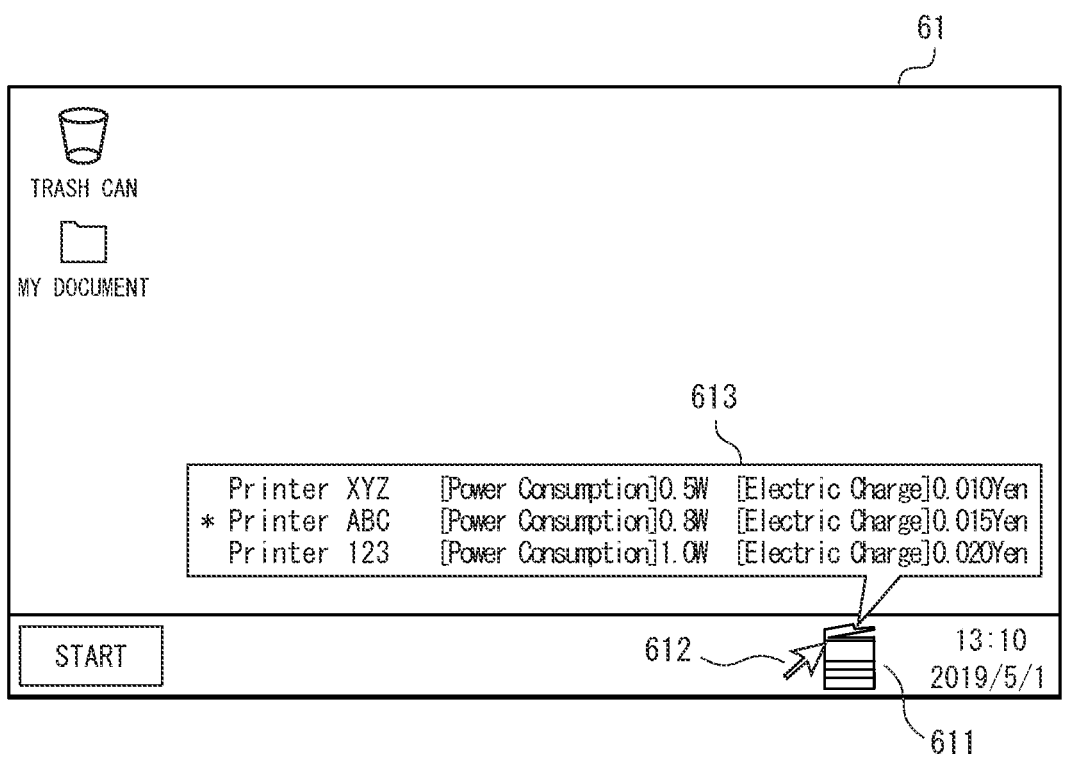
FIG. 6B is a plan view showing another example of a display screen of power consumption estimated by the power consumption estimating part.

Moreover, as shown in FIG. 6B, in a case where a mouse cursor is placed on an icon 611 on a desktop screen 61 displayed on the displaying part 24 of the PC 20 or other case, a balloon 613 containing a list of the image forming apparatuses 10 selectable as the print destination may be displayed. In such a situation, the user can always confirm the power consumption of each image forming apparatus 10. Moreover, when displaying the balloon 613, as shown in FIG. 6B, a marker, such as "*", may be applied to the image forming apparatus 10 presently selected as the print destination. In such a situation, the user can easily confirm whether or not the image forming apparatus 10 having the least power consumption is presently selected as the print destination. In an example shown in FIG. 6B, the user can confirm that there is the image forming apparatus "Printer XYZ" having the power consumption less than the image forming apparatus "Printer ABC" presently selected as the print destination. Further, when displaying the balloon 613, as shown in FIG. 6B, similarly to the printer list 603, the image forming apparatuses 10 may be displayed in ascending order of the power consumption or in ascending order of the electric charge from the top of the list.

Next, the transmitting sequence of the status information at the normal mode will be described. FIG. 5B illustrates an example of the transmitting sequence for the status information at the normal mode. As shown in FIG. 5B, the state information transmitting part 11 of the image forming apparatus 10 transmits the state information to the PC 20 at fixed intervals or intermittently (step S511). A transmission timing of the status information is previously determined. Incidentally, setting of the transmission timing of the status information may be changed by the user or the like.

When the PC receives the state information, processing of step 512 is carried out. Incidentally, processing of step 512 is similar to processing of step 502. Incidentally, the power consumption estimating part 21 estimates the power consumption from an added value of the above-described electric power amounts a1 and a2.

Subsequently, when given user operation is inputted via an inputting device (not shown), such as a key board, processing of step 513 is carried out. Incidentally, processing of step 513 is similar to processing of step 503, and therefore, its explanation is omitted.

As described above, in the printing system 1 according to the embodiment of the present disclosure, the PC 20 (20-1, 20-2) estimates the electric power amount consumed by print processing of each image forming apparatus 10 on the basis of the state information received from the image forming apparatus 10 (10-1, 10-2, 10-3). Subsequently, the PC 20 displays the estimated power consumption of each image forming apparatus 10 on the displaying device 24. Thereby, when selecting the image forming apparatus 10 for executing print out of the plurality of image forming apparatuses 10 selectable as the print destination, the user of the PC 20 can select the image forming apparatus 10 having the least power consumption.

Thus, in accordance with the above-described embodiment, it is possible to reduce the power consumption when print processing of the printing system 1. Moreover, since the user can select the image forming apparatus 10 for executing print, it is possible to prevent a case where, as a method of a conventional technique, the image forming apparatus located separate from a seat of the user is automatically selected, and therefore, to prevent lowering of convenience of the user.

Moreover, in the printing system 1 of the embodiment, the status information contains information indicating the present temperature of the fixing device 12. In addition, the PC 20 further includes the power consumption table holding part 23 holding the power consumption table indicating a relationship between the temperature of the fixing device 12 and the electric power amount consumed by print processing of the image forming apparatus 10. Subsequently, the power consumption estimating part 21 of the PC 20 estimates the electric power amount consumed by print processing of the image forming apparatus 10 from the present temperature of the fixing device 12 obtained from the state information by using the power consumption table held by the power consumption table holding part 23. As described above, the present temperature of the fixing device 12 is a parameter greatly affecting on the electric power amount consumed by print processing of the image forming apparatus 10. Therefore, in such a configuration, it is possible to correctly estimate the electric power amount consumed by print processing of the image forming apparatus 10.

Moreover, in the printing system 1 of the embodiment, the power consumption table holding part 23 of the PC 20 holds the power consumption tables respectively corresponding to the plurality of image forming apparatuses 10. In such a configuration, even if the machine models of the plurality of image forming apparatuses 10 are different, it is possible to correctly estimate the electric power amount consumed by print processing of the image forming apparatus 10.

Moreover, in the printing system 1 of the embodiment, the operation mode of the image forming apparatus 10 contains at least the normal mode and the sleep mode having power consumption less than the normal mode. In addition, the status information contains information indicating the operation mode of the image forming apparatus 10, and the power consumption table holding part 23 holds the power consumption tables corresponding for each operation mode with regard to each of the plurality of image forming apparatuses 10. Subsequently, the power consumption estimating part 21 estimates the electric power amount consumed by print processing of the image forming apparatus 10 from the present temperature of the fixing device 12 obtained from the state information by using the power consumption table corresponding to the operation mode obtained from the state information.

Thereby, it is possible to estimate the electric power amount consumed by print processing of each image forming apparatus 10 in accordance with the present operation mode of each image forming apparatus 10. As described above, the electric power amount consumed by print processing of the image forming apparatus 10 is varied between a case receiving the print job at the normal mode and a case receiving the print job at the sleep mode. Therefore, in such a configuration, it is possible to more correctly estimate the electric power amount consumed by print processing of the image forming apparatus 10.

Moreover, in the printing system 1 of the embodiment, the display controlling part 22 of the PC 20 displays the power consumption estimated by the power consumption estimating part 21 in combination with the identification information of the image forming apparatus on the displaying device 24. Thereby, the user can specify the image forming apparatus 10 having the least power consumption out of the plurality of image forming apparatuses 10 installed on a floor or specify an installation location of each image forming apparatus 10 on a floor, on the basis of the identification information of the image forming apparatus 10. Therefore, it is possible to improve convenience of the user.

Incidentally, the display controlling part 22 may display information capable of specifying a location installing the image forming apparatus 10 together with the identification information of the image forming apparatus 10 in combination with the power consumption estimated by the power consumption estimating part 21. In such a configuration, it is possible to more improve convenience of the user.

Moreover, in the printing system 1 of the embodiment, the display controlling part 22 of the PC 20 displays a combination of the power consumption estimated by the power consumption estimating part 21 and the identification information of the image forming apparatus as a list on the displaying device 24, and further displays combinations respectively corresponding to the image forming apparatuses 10 having the less power consumption estimated by the power consumption estimating part 21 in ascending order from the top of the list. Thereby, if there are many image forming apparatuses 10 selectable as the print destination, the user can easily specify the image forming apparatus 10 having the least power consumption by referring to the list.

Moreover, in the printing system 1 of the embodiment, the power consumption estimating part 21 of the PC 20 further estimates the electric charge corresponding to the electric power amount consumed by print processing of the image forming apparatus 10 with regard to the plurality of image forming apparatuses 10. The display controlling part 22 displays the electric charge estimated by the power consumption estimating part 21 in combination with the identification information of the image forming apparatus 10 on the displaying device 24. Thus, by informing the electric charge required for print processing to the user by displaying, it is possible to achieve energy saving with considering the electric charge.

Moreover, in the printing system 1 of the embodiment, the display controlling part 22 of the PC 20 displays a combination of the electric charge estimated by the power consumption estimating part 21 and the identification information of the image forming apparatus as a list on the displaying device 24, and further displays combinations respectively corresponding to the image forming apparatuses 10 having the less electric charge estimated by the power consumption estimating part 21 in ascending order from the top of the list. Thereby, if there are many image forming apparatuses 10 selectable as the print destination, the user can easily specify the image forming apparatus 10 having the least electric charge by referring to the list.

Further, in the printing system 1 of the embodiment, the state information transmitting part 11 of the image forming apparatus 10 transmits the state information at fixed intervals or intermittently. As described with reference to FIG. 3, the temperature of the fixing device 12 of the image forming apparatus 10 is varied according to operation status or the like of the image forming apparatus 10. Therefore, in such a configuration, if an operation status of the image forming apparatus 10 is varied, it is possible to always correctly estimate the electric power amount consumed by print processing at a side of the PC 20.

Incidentally, in the above-described embodiment, the image forming apparatus 10 of an electrographic manner is illustrated. However, the printing system 1 may include a different image forming apparatus 10 in a different manner, such as an image forming apparatus 10 in an ink jet manner. In such a case, the power consumption estimating part 21 of the PC 20 may obtain a different parameter greatly affecting on the power consumption (the electric power amount consumed by print processing) of the different image forming apparatus 10 in the different manner from the different image forming apparatus 10 instead of the temperature of the fixing device 12. Subsequently, the power consumption table holding part 24 may hold a different power consumption table indicating a relationship between the different parameter and the power consumption of the different image forming apparatus 10.

Here, a correspondence relation between steps in FIG. 5A and FIG. 5B and steps in a method of printing in the printing system 1 defined in the claims will be described. Step S501 in FIG. 5A and step S511 in FIG. 5B are concrete examples of a state information transmitting step. Moreover, step S502 in FIG. 5A and step S512 in FIG. 5B are concrete examples of a power consumption estimating step. Further, step S503 in FIG. 5A and step S513 in FIG. 5B are concrete examples of a display controlling step.

Moreover, the present disclosure may be suitably varied within range not contrary to summary or idea of the disclosure been readable from the claims and the whole of the specification, and a printing system having such variation is also included in technical idea of the disclosure.

The invention claimed is:

1. A printing system comprising:
a user terminal; and
a plurality of image forming apparatuses,
wherein each of the plurality of image forming apparatuses includes a status information transmitting part transmitting status information indicating a status of the image forming apparatus, the user terminal includes:

a power consumption estimating part estimating power consumption consumed by print processing in the image forming apparatus on the basis of the state information received from the image forming apparatus with regard to the plurality of image forming apparatuses; and a display controlling part controlling to display the power consumption estimated by the power consumption estimating part in association with each of the plurality of image forming apparatuses on a displaying device, the status information contains information indicating present temperature of a fixing device, the user terminal further includes a power consumption table holding part holding a power consumption table indicating a relationship between temperature of the fixing device and power consumption consumed by print processing of the image forming apparatus, and the power consumption estimating part estimates the power consumption consumed by print processing of the image forming apparatus from the present temperature of the fixing device obtained from the state information by using the power consumption table.

2. The printing system according to claim 1, wherein the power consumption table holding part holds power consumption tables respectively corresponding to the plurality of image forming apparatuses.

3. The printing system according to claim 2, wherein the status information contains information indicating an operation mode of the image forming apparatus, the operation mode contains at least a normal mode and a sleep mode having power consumption less than the normal mode, the power consumption table holding part holds the power consumption tables corresponding for each operation mode with regard to each of the plurality of image forming apparatuses, the power consumption estimating part estimates the power consumption consumed by print processing of the image forming apparatus from the present temperature of the fixing device obtained from the state information by using the power consumption table corresponding to the operation mode obtained from the state information.

4. The printing system according to claim 3, wherein the power consumption estimating part estimates the power consumption in a case of receiving a print job at the normal mode by adding an electric power amount required for warm-up and an amount obtained by multiplying an electric power amount required for print of one sheet by the number of print sheets, and estimates the power consumption in a case of receiving a print job at the sleep mode by adding an electric power amount required for warm-up, an amount obtained by multiplying an electric power amount required for print of one sheet by the number of print sheets and an electric power amount for maintaining the fixing device to standby temperature for a print standby period.

5. The printing system according to claim 1, wherein the display controlling part displays the power consumption estimated by the power consumption estimating part in combination with identification information of the image forming apparatus on the displaying device.

6. The printing system according to claim 5, wherein the display controlling part displays a combination of the power consumption estimated by the power consumption estimating part and the identification information of the image forming apparatus as a list on the displaying device, and further displays combinations respectively corresponding to the image forming apparatuses having less power consumption estimated by the power consumption estimating part in ascending order from a top of the list.

7. The printing system according to claim 1, wherein the power consumption estimating part further estimates an electric charge corresponding to the power consumption consumed by print processing of the image forming apparatus with regard to the plurality of image forming apparatuses, the display controlling part displays the electric charge estimated by the power consumption estimating part in combination with identification information of the image forming apparatus on the displaying device.

8. The printing system according to claim 7, wherein the display controlling part displays a combination of the electric charge estimated by the power consumption estimating part and the identification information of the image forming apparatus as a list on the displaying device, and further displays combinations respectively corresponding to the image forming apparatuses having less electric charge estimated by the power consumption estimating part in ascending order from a top of the list.

9. The printing system according to claim 1, wherein the state information transmitting part transmits the state information at fixed intervals or intermittently.

* * * * *